United States Patent
Jang et al.

(10) Patent No.: US 11,316,613 B2
(45) Date of Patent: Apr. 26, 2022

(54) METHOD OF TRANSCEIVING SIGNAL BY USING POLAR CODE AND DEVICE FOR PERFORMING THE METHOD

(71) Applicants: Samsung Electronics Co., Ltd., Suwon-si (KR); POSTECH Research and Business Development Foundation, Pohang-si (KR)

(72) Inventors: Min Jang, Suwon-si (KR); Kyeongcheol Yang, Pohang-si (KR); Daeyeol Yang, Pohang-si (KR); Jiwon Park, Pohang-si (KR); Hongsil Jeong, Suwon-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 164 days.

(21) Appl. No.: 16/734,913

(22) Filed: Jan. 6, 2020

(65) Prior Publication Data
US 2020/0220654 A1 Jul. 9, 2020

(30) Foreign Application Priority Data

Jan. 7, 2019 (KR) .................. 10-2019-0001924

(51) Int. Cl.
*H04L 1/00* (2006.01)
*H04L 5/00* (2006.01)

(52) U.S. Cl.
CPC .......... *H04L 1/0057* (2013.01); *H04L 1/0042* (2013.01); *H04L 1/0047* (2013.01); *H04L 5/0053* (2013.01)

(58) Field of Classification Search
CPC ... H04L 1/0057; H04L 1/0042; H04L 1/0047; H04L 5/0053; H04L 1/0058; H04L 1/007; H04L 1/0078; H03M 13/19; H03M 13/615
See application file for complete search history.

(56) References Cited

U.S. PATENT DOCUMENTS

| | | | | |
|---|---|---|---|---|
| 6,760,367 | B1 * | 7/2004 | Smyka | H04L 1/0061 375/220 |
| 10,230,401 | B2 * | 3/2019 | Watanabe | H03M 13/2927 |
| 2016/0352358 | A1 * | 12/2016 | Ordentlich | H03M 13/47 |
| 2017/0187395 | A1 * | 6/2017 | Watanabe | H03M 13/2909 |
| 2018/0059933 | A1 * | 3/2018 | Helmick | G06F 12/0246 |

(Continued)

OTHER PUBLICATIONS

Onurcan Iscan et al., "Shaped polar codes for higher order modulation", IEEE Communications Letters, vol. 22, No. 2, pp. 252-255, Feb. 2018.

(Continued)

*Primary Examiner* — Jay P Patel
(74) *Attorney, Agent, or Firm* — Jefferson IP Law, LLP

(57) ABSTRACT

A method and a device for transmitting a signal by using a polar code are provided. The method includes generating a first codeword by applying the polar code to an input signal, dividing the first codeword into a plurality of partial vectors, allocating a shaping bit to the input signal when at least one of the plurality of partial vectors does not satisfy a preset Hamming weight condition, generating a second codeword by applying the polar code to the input signal to which the shaping bit is allocated, and transmitting a signal based on the second codeword.

20 Claims, 15 Drawing Sheets

(56) References Cited

U.S. PATENT DOCUMENTS

| | | |
|---|---|---|
| 2018/0205496 A1 | 7/2018 | Kudekar et al. |
| 2018/0212624 A1 | 7/2018 | Li et al. |
| 2019/0326933 A1* | 10/2019 | Zhang ..................... H04L 1/00 |
| 2020/0083910 A1* | 3/2020 | Dai ...................... H03M 13/13 |
| 2021/0203362 A1* | 7/2021 | Chiu .................... H03M 13/27 |

OTHER PUBLICATIONS

Onurcan Iscan et al: 11 Polar Codes with Integrated Probabilistic Shaping for 5G New Radio 11, arxiv.org, Cornell University Library, 201 Olin Library Cornell University Ithaca, NY14853, Aug. 28, 2018 (Aug. 28, 2018), XP081266967.

Onurcan Iscan et al: 11 Probabilistically, Shaped Multi-Level Coding with Polar Codes for Fading Channels 11, arxiv.org, Cornell University Library, 201 Olin Library Cornell University Ithaca, NY 14853, Dec. 19, 2018 (Dec. 19, 2018), XP080994569.

European Search Report dated May 28, 2020, issued in European Application No. 20150352.1.

* cited by examiner $G_{16} =$ [matrix of binary values]

Shaping bit

* $W_H(C_1) \leq 4$ 
* $W_H(C_2) \leq 4$

FIG. 6C $G_{16} =$

| 1 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 1 | 0 | 0 | 0 | 0 | 0 | 0 | 0 |
| 1 | 0 | 0 | 0 | 1 | 0 | 0 | 0 | 0 | 0 | 0 | 0 | 0 | 0 | 0 | 0 |
| 1 | 0 | 0 | 0 | 1 | 0 | 0 | 1 | 0 | 0 | 0 | 1 | 0 | 0 | 0 | 0 |
| 1 | 0 | 1 | 0 | 0 | 0 | 0 | 0 | 0 | 0 | 0 | 0 | 0 | 0 | 0 | 0 |
| 1 | 0 | 1 | 0 | 0 | 0 | 0 | 0 | 1 | 0 | 1 | 0 | 0 | 0 | 0 | 0 |
| 1 | 0 | 1 | 0 | 1 | 0 | 1 | 0 | 0 | 0 | 0 | 0 | 0 | 0 | 0 | 0 |
| 1 | 0 | 1 | 0 | 1 | 0 | 1 | 0 | 1 | 0 | 1 | 0 | 1 | 0 | 1 | 0 |
| 1 | 1 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 1 | 1 | 0 | 0 | 0 | 0 | 0 | 0 |
| 1 | 1 | 0 | 0 | 1 | 1 | 0 | 0 | 0 | 0 | 0 | 0 | 0 | 0 | 0 | 0 |
| 1 | 1 | 0 | 0 | 1 | 1 | 0 | 0 | 1 | 1 | 0 | 0 | 1 | 1 | 0 | 0 |

Shaping bit

* $W_H(C_1) \leq 2$
* $W_H(C_2) \leq 2$
* $W_H(C_3) \leq 2$
* $W_H(C_4) \leq 2$

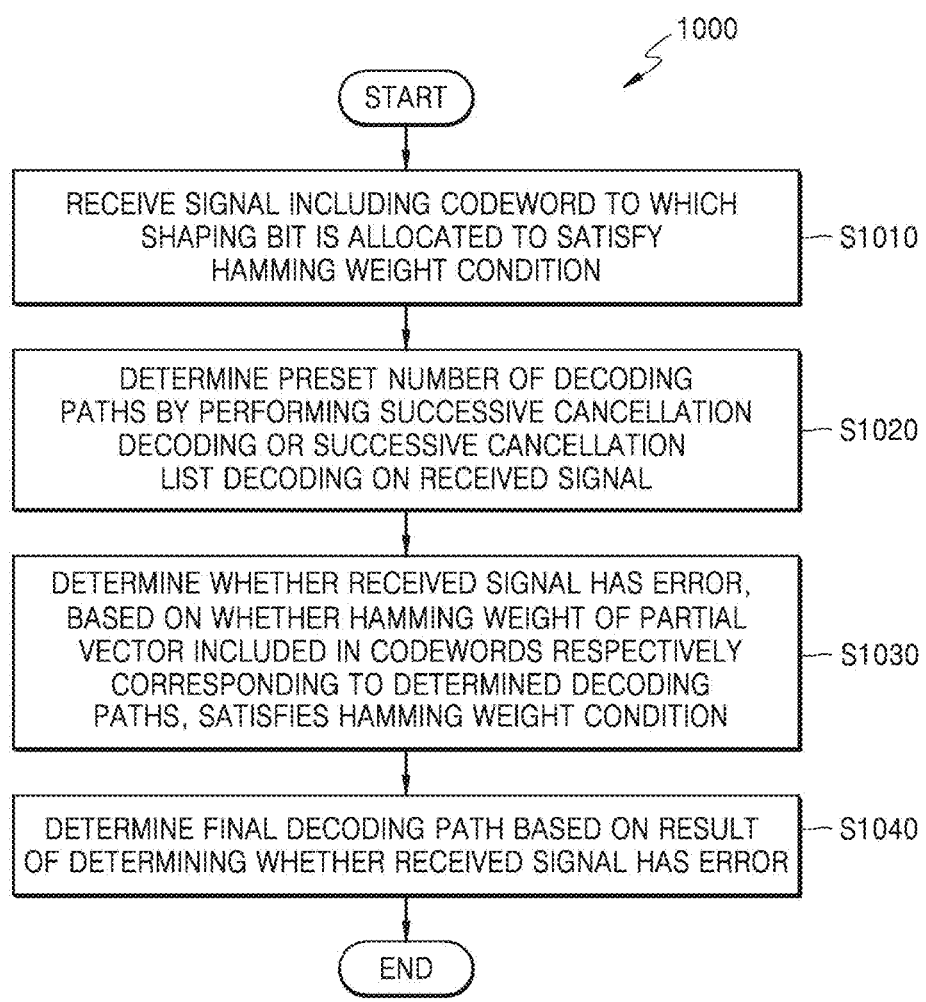

METHOD OF TRANSCEIVING SIGNAL BY USING POLAR CODE AND DEVICE FOR PERFORMING THE METHOD

CROSS-REFERENCE TO RELATED APPLICATION(S)

This application is based on and claims priority under 35 U.S.C. § 119(a) of a Korean patent application number 10-2019-0001924, filed on Jan. 7, 2019, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) POSTECH Research and Business Development Foundation.

BACKGROUND

1. Field

The disclosure relates to a method of transceiving a signal by using a polar code and a device for performing the method.

2. Description of Related Art

To meet the increase in demand for wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data transmission rate, 5G communication systems are being developed to be implemented in a super-high frequency band (millimeter wave (mmWave)), e.g., a band of 60 GHz. In order to reduce the occurrence of stray electric waves in such a super-high frequency band and to increase a transmission distance of electric waves in 5G communication systems, various technologies are being studied, for example: beamforming, massive multiple input multiple output (MIMO), Full Dimensional MIMO (FD-MIMO), array antennas, analog beamforming, and large scale antennas. In order to improve system networks for 5G communication systems, various technologies have been developed, e.g.: evolved small cells, advanced small cells, cloud radio access networks (cloud RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid modulation of frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is being newly provided, in which technology related to the IoT is combined with, for example, technology for processing big data through connection with a cloud server. In order to implement the IoT, various technical elements are required, such as, a sensing technique, wired/wireless communication and network infrastructures, a service interfacing technique, a security technique, etc. In recent years, techniques including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beamforming, MIMO, array antenna, etc. The application of the cloud RAN by using a big data processing technique described above may be an example of convergence of the 5G communication technology and the IoT technology.

As described above, with the progress in mobile communication systems, various services are now providable, and thus, a way of smoothly providing these services is required.

Thus, in the new communication systems as described above, an encoding and decoding method, to which an error correction code with higher performance is applied, is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of reducing a rate of data error occurring during data transmission and reception and improving communication performance, and a device for performing the method.

Another aspect of the disclosure is to provide a method of transceiving a signal by using a polar code and a device for performing the method.

Additional aspects will be set forth in part in the description which follows and, in part, will be apparent from the description, or may be learned by practice of the presented embodiments.

In accordance with an aspect of the disclosure, a method of transmitting signal by using a polar code is provided. The method includes generating a first codeword by applying the polar code to an input signal, dividing the first codeword into a plurality of partial vectors, allocating at least one shaping bit to the input signal when at least one of the plurality of partial vectors does not satisfy a preset Hamming weight condition, generating a second codeword by applying the polar code to the shaping bit-allocated input signal, and transmitting the signal based on the second codeword.

The dividing of the first codeword may include, when the allocated at least one shaping bit includes $2^r$ shaping bits, dividing the first codeword consisting of N bits into $2^r$ partial vectors having a length of $$\frac{N}{2^r},$$

wherein the Hamming weight condition is set such that, according to a target probability of the first codeword, a Hamming weight of each of the plurality of partial vectors exceeds or is less than $$\frac{N}{2^{r+1}}$$

which corresponds to a half of the length $$\frac{N}{2^r}.$$

The Hamming weight condition may be set such that, when the target probability of the first codeword is less than ½, the Hamming weight of the plurality of partial vectors is set to be less than $$\frac{N}{2^{r+1}}$$

which corresponds to a half of the length $$\frac{N}{2^r},$$

and when the target probability of the first codeword exceeds ½, the Hamming weight of the plurality of partial vectors is set to exceed $$\frac{N}{2^{r+1}}$$

which corresponds to a half of the length $$\frac{N}{2^r}.$$

The allocating of the at least one shaping bit may include determining a position and a number of the at least one shaping bit according to a preset target probability of bits of the first codeword.

The method may further include performing cyclical redundancy check (CRC) encoding on the second codeword, and transmitting the CRC-encoded second codeword.

In accordance with another aspect of the disclosure, a method of receiving a signal by using a polar code includes receiving a signal is provided. The method includes a codeword to which a shaping bit is allocated to satisfy a Hamming weight condition, determining a preset number of decoding paths by performing on the received signal one of successive cancellation decoding or successive cancellation list decoding, determining whether the received signal has an error, based on whether a Hamming weight of a partial vector included in codewords respectively corresponding to the determined decoding paths satisfies the Hamming weight condition, and selecting a final decoding path from among the determined decoding paths based on a result of the determining of whether the received signal has an error.

The determining of whether the received signal has an error may further include dividing a codeword from among the codewords respectively corresponding to the determined decoding paths into $2^r$ partial vectors having a length of $$\frac{N}{2^r},$$

each of the codewords respectively corresponding to the determined decoding paths consisting of N bits, wherein the Hamming weight condition is set such that, according to a target probability of the codewords respectively corresponding to the determined decoding paths, a Hamming weight of each of the plurality of partial vectors exceeds or is less than $$\frac{N}{2^{r+1}}$$

which corresponds to a half of the length $$\frac{N}{2^{r+1}}.$$

The determining of whether the received signal has an error may further include determining that the Hamming weight of the partial vector included in the codewords from among the codewords respectively corresponding to the determined decoding paths does not satisfy the Hamming weight condition, has an error.

The selecting of the final decoding path may include selecting a decoding path other than the decoding path determined to have an error, as the final decoding path.

The method may further include performing a CRC on the codewords respectively corresponding to the determined decoding paths, wherein the determining of whether the received signal has an error includes determining whether a codeword from among the codewords respectively corresponding to the determined decoding paths satisfies the Hamming weight condition, based on a result of the performing of the CRC.

In accordance another aspect of the disclosure, a transmitter device for transmitting a signal by using a polar code is provided. The transmitter device includes a communicator configured to perform communication with at least one other device, a memory storing at least one instruction, and at least one processor operatively coupled to the communicator and the memory and configured to execute the at least one instruction, wherein the at least one instruction configures the at least one processor to generate a first codeword by applying the polar code to an input signal, divide the first codeword into a plurality of partial vectors, allocate at least one shaping bit to the input signal when at least one of the plurality of partial vectors does not satisfy a Hamming weight condition, generate a second codeword by applying the polar code to the input shaping bit-allocated signal, and transmit the signal based on the second codeword.

The at least one processor may be further configured to execute the at least one instruction to when the allocated at least one shaping bit includes 2 shaping bits, divide the first codeword consisting of N bits into $2^r$ partial vectors having a length of $$\frac{N}{2^r},$$

wherein the Hamming weight condition is set such that, according to a target probability of the first codeword, a Hamming weight of each of the plurality of partial vectors exceeds or is less than $$\frac{N}{2^{r+1}}$$

which corresponds to a half of the length $$\frac{N}{2^r}.$$

The at least one processor may be further configured to execute the at least one instruction to set the Hamming weight condition such that, when a target probability of the first codeword is less than ½, a Hamming weight of each of the plurality of partial vectors is set to less than $$\frac{N}{2^{r+1}}$$

corresponding to a half of a length of $$\frac{N}{2^r},$$

and when a target probability of the first codeword exceeds ½, the at least one processor may be further configured to set a Hamming weight of each of the plurality of partial vectors to exceed $$\frac{N}{2^{r+1}}$$

corresponding to a half of the length of $$\frac{N}{2^r}.$$

The at least one processor may be further configured to execute the at least one instruction to determine a position and a number of the at least one shaping bit according to a preset target probability of the bits of the first codeword.

The at least one processor may be further configured to execute the at least one instruction to perform a CRC encoding on the second codeword and transmit the CRC-encoded second codeword.

In accordance another aspect of the disclosure, a receiver device for receiving a signal by using a polar code is provided. The receiver device includes a communicator configured to perform communication with at least one other device, a memory storing at least one instruction, and at least one processor operatively coupled to the communicator and the memory and configured to execute the at least one instruction, wherein the at least one instruction configures the at least one processor to receive a signal including a codeword to which a shaping bit is allocated to satisfy a Hamming weight condition, determine a preset number of decoding paths by performing on the received signal one of successive cancellation decoding or successive cancellation list decoding, determine whether the received signal has an error, based on whether a Hamming weight of a partial vector included in codewords respectively corresponding to the determined decoding paths satisfies a Hamming weight condition, and select a final decoding path from among the determined decoding paths based on a result of the determination of whether the received signal has an error.

The at least one processor may be further configured to execute the at least one instruction to when each of the codewords respectively corresponding to the determined decoding paths consists of N bits, divide a codeword from among the codewords respectively corresponding to the determined decoding paths into $2^r$ partial vectors having a length of $$\frac{N}{2^r},$$

and set the Hamming weight condition such that, according to a target probability of the codewords respectively corresponding to the determined decoding paths, a Hamming weight of each of the partial vectors exceeds or is less than $$\frac{N}{2^{r+1}}$$

which corresponds to a half of the length $$\frac{N}{2^r}.$$

The at least one processor may be further configured to determine that the Hamming weight of the partial vector included in the codewords from among the codewords corresponding to the determined decoding paths does not satisfy the Hamming weight condition.

The at least one processor may be further configured to execute the at least one instruction to select a decoding path other than the decoding path determined to have an error, as the final decoding path.

The at least one processor may be further configured to execute the at least one instruction to perform a CRC on the codewords respectively corresponding to the determined decoding paths, and determine whether a codeword from among the codewords respectively corresponding to the determined decoding paths satisfies the Hamming weight condition, based on a result of the performing of the CRC.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6C is a diagram of a generator matrix to which four shaping bits are allocated, according to an embodiment of the disclosure;

FIG. 10 is a flowchart of a method of decoding a signal by using a polar code, according to an embodiment of the disclosure.

Throughout the drawings, it should be noted that like reference numbers are used to depict the same or similar elements, features, and structures.

DETAILED DESCRIPTION

Figure 1:
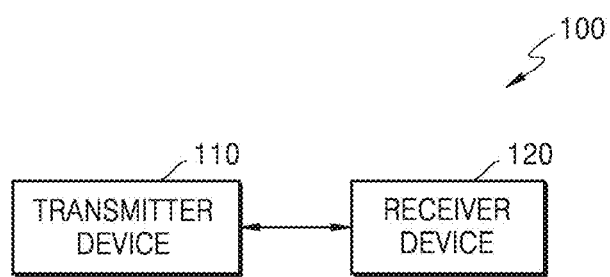
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In the present specification, when a constituent element "connects" or is "connected" to another constituent element, the constituent element contacts or is connected to the other constituent element not only directly but also electrically through at least one of other constituent elements interposed therebetween. Also, when a part may "include" a certain constituent element, unless specified otherwise, it may not be construed to exclude another constituent element but may be construed to further include other constituent elements.

The phrases "in some embodiments" or "in one embodiment" appearing in various places in this specification are not necessarily all referring to the same embodiment.

Some embodiments may be described in terms of functional block components and various processing steps. Such functional blocks may be realized by any number of hardware and/or software components configured to perform the specified functions. For example, the functional blocks of the disclosure may be one or more processors or microprocessors or circuit components for specified functions. Also, for example, the functional blocks according to the disclosure may be implemented using various programming or scripting language. Functional aspects may be implemented in algorithms that execute on one or more processors. Furthermore, the disclosure could employ any number of techniques according to the related art for electronics configuration, signal processing and/or data processing, and the like. The words "modules" and "components" are used broadly and are not limited to mechanical or physical components.

Furthermore, the connecting lines or connectors, shown in the various figures presented are intended to represent exemplary functional relationships and/or physical or logical couplings between the various elements. It should be noted that many alternative or additional functional relationships, physical connections or logical connections may be present in a practical device.

In addition, the description "at least one of A and B" means "A or B" or "A and B."

Hereinafter, one or more embodiments of the disclosure will be described with reference to accompanying drawings.

FIG. 1 illustrates a wireless communication system 100 according to an embodiment of the disclosure.

Referring to FIG. 1, the wireless communication system 100 may include a transmitter device 110 and a receiver device 120. The transmitter device 110 and the receiver device 120 may respectively correspond to a user device or a network apparatus. Examples of the user device may include a terminal, a mobile station, a user equipment and the like. In addition, examples of the network apparatus may include a base station, a node B, an evolved node B (eNodeB).

According to an embodiment of the disclosure, the transmitter device 110 and the receiver device 120 may perform transception by using a polar code.

Applying a polar code to a certain signal may cause polarization of a channel capacity. That is, channel polarization refers to a phenomenon where a capacity of a certain channel is changed to 1, and that of the others is changed to 0 when several channels are combined and then separated into another several channels by using a polar code.

Thus, the transmitter device 110 may be aware of those channels that have a channel capacity of 1 according to channel polarization, and by delivering information carrying the information only in those channels, a desired channel capacity may be achieved.

According to an embodiment of the disclosure, the transmitter device 110 may allocate a shaping bit to a codeword to adjust a probability distribution of bits constituting the codeword. In detail, to reduce a rate or error of signals due to noise or fading or the like of a channel when transmitting a signal, the transmitter device 110 may allocate a shaping bit to a partial vector constituting a codeword such that a probability distribution of bits constituting the codeword follows a Gaussian distribution.

In addition, according to an embodiment of the disclosure, the receiver device 120 may receive a signal including a codeword, to which a shaping bit is allocated, and determine whether an error has occurred in the signal by using the shaping bit.

Hereinafter, a method of transceiving a signal by using a polar code and a device of the method will be described with reference to FIGS. 2 through 10.

Figure 2:
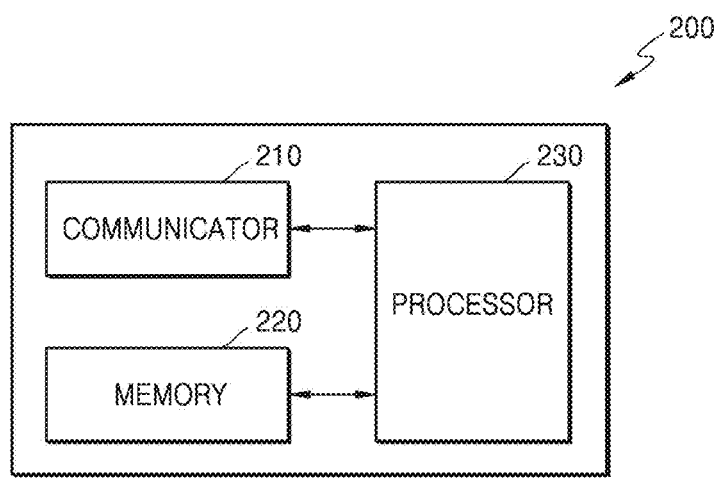
FIG. 2 is a structural block diagram of a transmitter device according to an embodiment of the disclosure.

FIG. 2 is a structural block diagram of a transmitter device according to an embodiment of the disclosure. A transmitter device 200 according to an embodiment of the disclosure may correspond to the transmitter device 110 described with reference to FIG. 1. Thus, in the description of the transmitter device 200, description of those details provided with reference to the embodiment of FIG. 1 will be omitted.

Referring to FIG. 2, the transmitter device 200 may include a communicator 210, a memory 220, and a processor 230. The communicator 210, the memory 220, and the processor 230 of the transmitter device 200 may operate according to the method of transceiving a signal by using a polar code according to an embodiment of the disclosure. However, components of the transmitter device 200 according to an embodiment of the disclosure are not limited to the above-described examples. According to another embodiment of the disclosure, the transmitter device 200 may include more components or fewer components than the above-described components. Moreover, in certain cases, the communicator 210, the memory 220, and the processor 230 may be implemented as a single chip.

According to another embodiment of the disclosure, the communicator 210 may include a transmitting portion and a receiving portion. The communicator 210 may transmit or receive a signal to or from the receiver device 120 described above with reference to FIG. 1. The signal may include control information and data. To this end, the communicator 210 may include a radio frequency (RF) transmitter that upwardly converts and amplifies a frequency of a transmitted signal and an RF receiver that performs low noise-amplification on a received signal and downwardly converts a frequency of the signal. In addition, the communicator 210 may receive a signal through a wireless channel and output the same to the processor 230, and transmit a signal output from the processor 230 through a wireless channel.

The memory 220 may store a polar code or data that are used in encoding performed in the transmitter device 200, and may have a region to store data needed to control the processor 230 and data generated during the control in the processor 230.

The processor 230 may control a series of processes in which the transmitter device 200 may operate according to an embodiment of the disclosure.

In a signal transmitter device by using a polar code, the transmitter device 200 may include: a communicator configured to perform communication with at least one other device; a memory storing at least one instruction; and at least one processor 230 configured to execute the at least one instruction. The processor 230 may generate a first codeword by applying a polar code to an input signal, divide the first codeword into a plurality of partial vectors, and when at least one of the plurality of partial vectors does not satisfy a Hamming weight condition, the processor 230 may allocate a shaping bit to the input signal, generate a second codeword by applying a polar code to the input signal to which the shaping bit is allocated, and transmit a signal based on the second codeword.

In detail, before transmitting a signal to at least one other device via the communicator 210, the processor 230 may encode the signal. In detail, the processor 230 may generate a first codeword by applying a polar code to an input signal. According to an embodiment of the disclosure, the processor 230 may apply a polar code to an input signal by using a matrix $G_N$ (generator matrix) of Equation 1 below.

$$G_N = B_N F^{\otimes n} \quad \text{Equation 1}$$

$G_N$ is a generator matrix for generating a codeword, $B_N$ is a bit-reversal permutation matrix of a size of N×N and is $$F = \begin{bmatrix} 1 & 0 \\ 1 & 1 \end{bmatrix}.$$

In addition, $F^{\otimes n}$ may be obtained as a result by performing an nth-order Kronecker product operation on F. For example, $F^{\otimes 2}$ may be a second-order Kronecker product of F and expressed as Equation 2.

$$F^{\otimes 2} = \begin{bmatrix} F & 0 \\ F & F \end{bmatrix} = \begin{bmatrix} 1 & 0 & 0 & 0 \\ 1 & 1 & 0 & 0 \\ 1 & 0 & 1 & 0 \\ 1 & 1 & 1 & 1 \end{bmatrix} \qquad \text{Equation 2}$$

According to an embodiment of the disclosure, upon receiving an input signal, the processor 230 may obtain a first codeword by applying the above-described generator matrix to the received input signal. That is, the processor 230 may obtain a first codeword according to Equation 3 below.

$$c = uG_N \qquad \text{Equation 3}$$

Upon receiving an input signal, the processor 230 may convert the input signal into a vector form. Accordingly, a vector u may correspond to a vector corresponding to the input signal. Hereinafter, u will be referred to as an input vector.

The input vector u may be constructed by allocating an information value to a position of a bit corresponding to K elements of an information set I and allocating a frozen value of 0 to a position of N−K bits belonging to a frozen set F.

According to an embodiment of the disclosure, the processor 230 may divide the generated first codeword C into a plurality of partial vectors, and allocate a shaping bit to the input vector u such that the partial vectors respectively satisfy a preset Hamming weight condition.

Hereinafter, a detailed operation of the processor 230 will be described with reference to FIGS. 3A through 7.

Figure 3A:
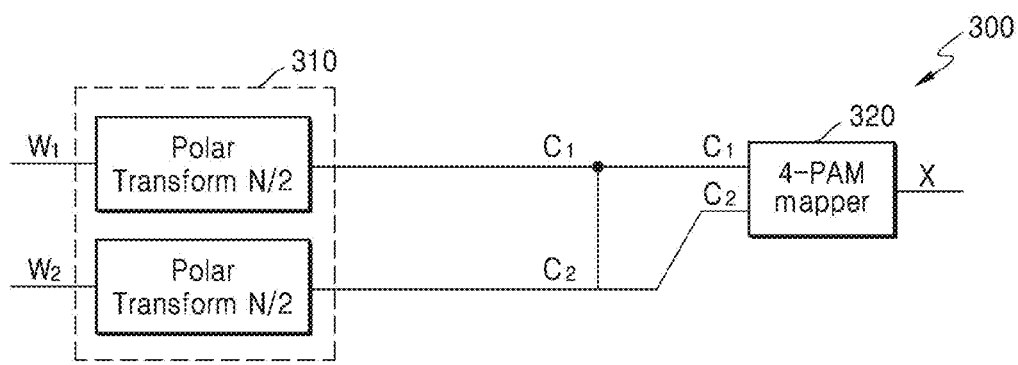
FIG. 3A illustrates a 4-pulse-amplitude modulation (PAM) polar encoder according to an embodiment of the disclosure.

FIG. 3A illustrates a 4-PAM (4-pulse amplitude modulation (PAM)) polar encoder 300 according to an embodiment of the disclosure. An operation of the 4-PAM polar encoder 300 of FIG. 3A may be performed by the processor 230.

Referring to FIG. 3A, the 4-PAM polar encoder 300 may include a polar code applier 310 and a 4-PAM mapper 320. That is, the processor 230 may perform operations of the polar code applier 310 and the 4-PAM mapper 320.

Referring to FIG. 3A, the processor 230 may generate codewords c1 and c2 by applying an input signal to the polar code applier 310. Here, it is assumed that an input signal having a length of 4 (N=4) is input. The processor 230 may divide the generated codewords into a plurality of partial vectors. Referring to FIG. 3A, each of the partial vectors may be divided into two, and a length of each partial vector may be 2. The processor 230 may generate a codeword as in Equation 4 below.

$$x = [c1 \ c2] = [w1 + w2 \ w2] = [w1 \ w2]\begin{bmatrix} 1 & 0 \\ 1 & 1 \end{bmatrix} \qquad \text{Equation 4}$$

Codewords generated using the 4-PAM polar encoder 300 may correspond to each symbol; for example, when input signals are respectively w1=0, w2=1, a symbol x may be 11 according to Equation 5 below.

$$x = [w1 \ w2]\begin{bmatrix} 1 & 0 \\ 1 & 1 \end{bmatrix} = [0 \ 1]\begin{bmatrix} 1 & 0 \\ 1 & 1 \end{bmatrix} = [1 \ 1] \qquad \text{Equation 5}$$

Likewise, the processor 230 may perform the same operation on the other input signals. A symbol corresponding to a generated codeword may be respectively: 1) 11 when w1=0, w2=1; 2) 10 when w1=1, w2=0; 3) 00 when w1=0, w2=0; and 4) 01 when w1=1, w2=1.

In typical PAM, a probability distribution of codeword bits (a probability distribution of symbols corresponding to codewords) is uniform. Referring to Equation 6 below, a uniform probability distribution of codeword bits indicates that bit probabilities of input signals are equal to each other. For example, a probability that a bit included in each input signal is 0 or 1 may be equally 0.5.

$$\Pr(c_i=1) = 1 - \Pr(c_i=0) = 0.5, \ 0 \le i < N \qquad \text{Equation 6}$$

Figure 3B:
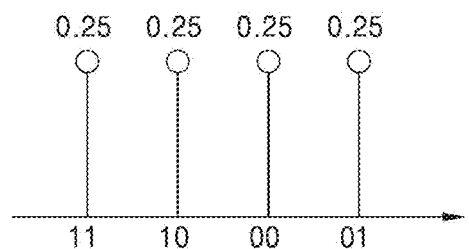
FIG. 3B is a graph showing a probability distribution of a 4-PAM symbol according to an embodiment of the disclosure.

FIG. 3B is a graph showing a probability distribution of a 4-PAM symbol according to an embodiment of the disclosure.

Referring to FIG. 3B, a probability distribution of a 4-PAM symbol according to an embodiment of the disclosure follows a uniform probability distribution. That is, because a probability that each bit included in each input signal is 0 or 1 is 0.5, a probability that a symbol corresponding to a codeword is 11, 10, 00, or 01 follows a uniform probability distribution of $(0.5)^2$, that is, 0.25.

In general, a rate or data error occurring when transmitting or receiving data is measured from an additive white Gaussian noise (AWGN) channel. An AWGN channel refers to a channel where only white Gaussian noise exists. In an AWGN channel, when a probability distribution of a transmitted signal follows a Gaussian shape (not shown), a rate of data error is reduced and thus communication performance may improve. Accordingly, the processor 230 needs to shape a probability distribution of codeword bits to be close to a Gaussian distribution. According to another embodiment of the disclosure, a probability distribution of codeword bits, whereby a rate or data error may be lowered, may be in another shape different from a Gaussian distribution.

That is, by adjusting a bit probability of each input signal, the processor 230 may shape a probability distribution of codeword bits to reduce a rate of data error. Hereinafter, a probability of a shaped codeword bit will be referred to as a 'target probability.'

Hereinafter, a polar encoder including a postcoder adjusting a probability distribution of a transmitted signal will be described with reference to FIGS. 4A through 5.

Figure 4A:
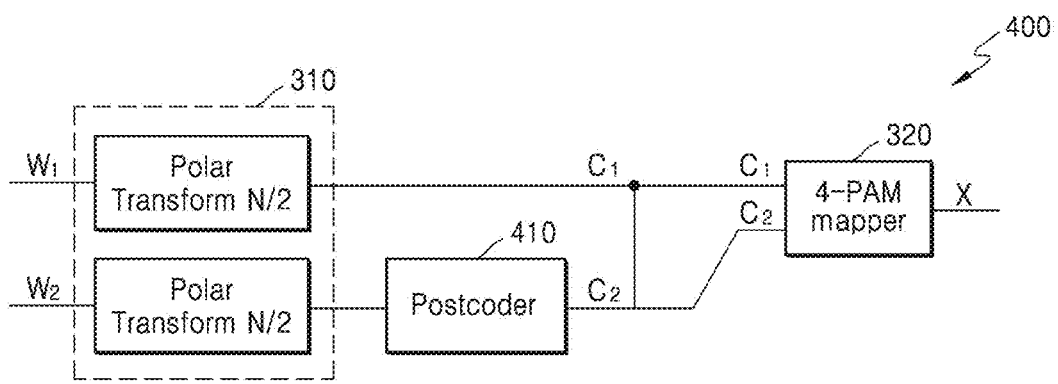
FIG. 4A is a structural diagram of a 4-PAM polar encoder including a postcoder, according to an embodiment of the disclosure.

FIG. 4A is a detailed view of a 4-PAM polar encoder 400 of a transmitter device according to an embodiment of the disclosure. An operation of the 4-PAM polar encoder 400 of FIG. 4A may be performed by the processor 230.

Referring to FIG. 4A, the 4-PAM polar encoder 400 may include the polar code applier 310, the 4-PAM mapper 320, and a postcoder 410. That is, the processor 230 may perform operations of the polar code applier 310, the 4-PAM mapper 320, and the postcoder 410. Here, in the 4-PAM polar encoder 400, components thereof identical to those of the 4-PAM polar encoder 300 are labeled with the same reference numerals and symbols. Thus, description provided above with reference to FIGS. 3A and 3B will be omitted here.

According to an embodiment of the disclosure, the processor 230 may control the polar code applier 310 to further include the postcoder 410 such that a probability distribution of codeword bits is close to a Gaussian distribution. That is, the processor 230 may control to construct a PAM symbol having a probability distribution that is close to a Gaussian distribution by adjusting a target probability of codeword bits by using the postcoder 410.

According to an embodiment of the disclosure, the processor 230 may generate a first codeword by applying a polar code to an input signal, divide the first codeword into a plurality of partial vectors, and when at least one of the plurality of partial vectors does not satisfy a Hamming weight condition, the processor 230 may allocate a shaping bit to the input signal. A Hamming weight indicates the number of bits that are not 0 in a codeword.

In detail, the processor 230 may divide a first codeword into a plurality of partial vectors, and the plurality of partial vectors may be included in a generator matrix $G_N$. The plurality of partial vectors used to divide a codeword may be obtained from Equations 2 and 4 described above, and thus description thereof will be omitted there.

Hereinafter, a row vector or a column vector will be collectively referred to as a partial vector for convenience of description. Also, while operation of the processor 230 is described with respect to a row vector, it is obvious that the same operation may be performed with respect to a column vector.

According to an embodiment of the disclosure, when allocating $2^r$ shaping bits, the processor 230 may divide a first codeword consisting of N bits into $2^r$ partial vectors having a length of $$\frac{N}{2^r},$$

and a Hamming weight condition may be set, according to a target probability of the first codeword, such that a Hamming weight of each of the plurality of partial vectors exceeds or is less than $$\frac{N}{2^{r+1}}$$

which corresponds to a half of the length of $$\frac{N}{2^r}.$$

In detail, when a target probability of the first codeword is greater than 0.5, the processor 230 may allocate a shaping bit to an input signal such that a Hamming weight of each of the plurality of partial vectors exceeds $$\frac{N}{2^{r+1}}$$

corresponding to a half of the length of $$\frac{N}{2^r}.$$

Also, when a target probability of the first codeword is less than 0.5, the processor 230 may allocate a shaping bit to an input signal such that a Hamming weight of each of the plurality of partial vectors is less than $$\frac{N}{2^{r+1}}$$

corresponding to a half of the length of $$\frac{N}{2^r}.$$

Figure 4B:
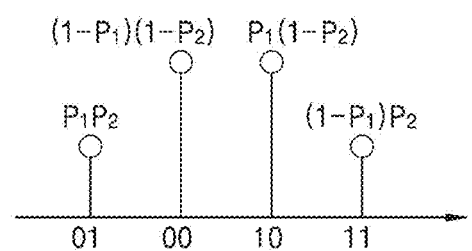
FIG. 4B is a graph showing a shaped probability distribution of a 4-PAM symbol according to an embodiment of the disclosure.

FIG. 4B is a graph showing a shaped probability distribution of a 4-PAM symbol according to an embodiment of the disclosure.

Referring to FIG. 4B, by allocating a shaping bit to partial vectors, the processor 230 may shape a probability distribution of codeword bits to be close to a shape of a Gaussian signal. That is, by allocating a shaping bit to partial vectors, the processor 230 may obtain a probability distribution of a generated second codeword bit as in Equation 7.

$$\begin{cases} Pr(c_{1i} = 1) = 1 - Pr(c_{1i} = 0) = p_1, & 0 \leq i < N/2 \\ Pr(c_{2i} = 1) = 1 - Pr(c_{2i} = 0) = p_2, & N/2 \leq i < N \end{cases} \quad \text{Equation 7}$$

Referring to FIG. 4B and Equation 7, a probability that the generated codeword c1 is 1 may be $P_1$, and a probability that the generated codeword c2 is 1 may be $P_2$, and a probability distribution of a codeword bit according to the above is as illustrated in FIG. 4B. That is, by adjusting the sizes of $P_1$ and $P_2$ by using the postcoder 410, a probability distribution of a codeword bit may be shaped to be close to a Gaussian distribution than a probability distribution of a 4-PAM polar code according to the related art.

In addition, according to an embodiment of the disclosure, the processor 230 may perform a cyclical redundancy check (CRC) encoding on the second codeword including a partial vector to which a shaping bit is allocated, and transmit the second codeword on which CRC encoding is performed. Accordingly, the processor 230 may further reduce a rate of data error by additionally performing CRC encoding on the second codeword.

Figure 5:
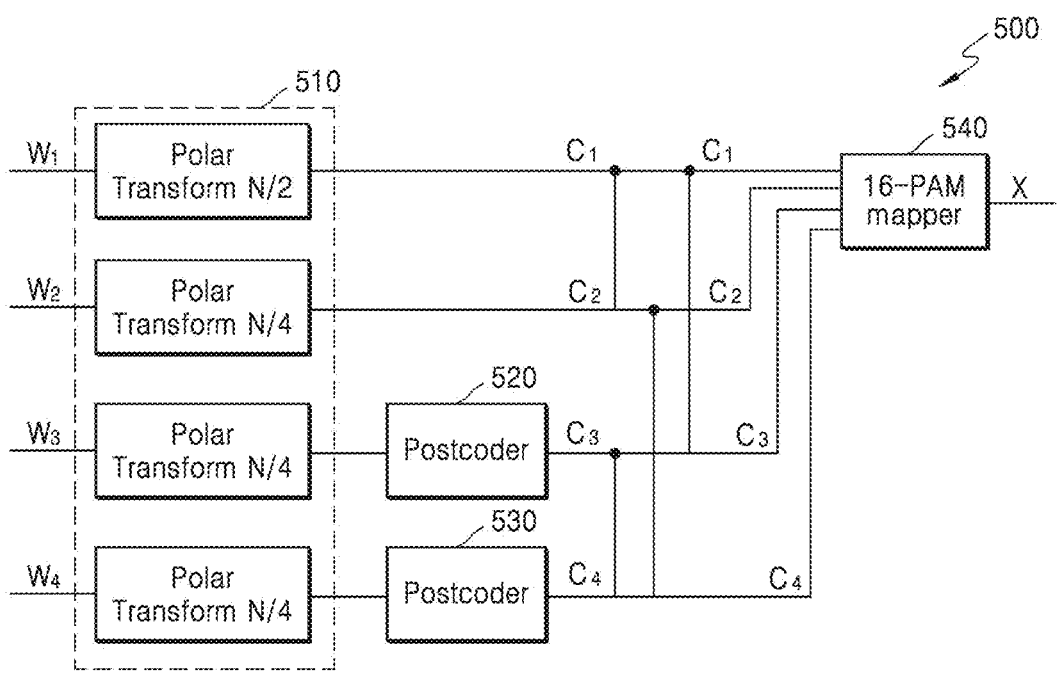
FIG. 5 is a structural diagram of a 16-PAM polar encoder including a postcoder according to an embodiment of the disclosure.

FIG. 5 is a structural diagram of a 16-PAM polar encoder 500 including a postcoder according to an embodiment of the disclosure. An operation of the 16-PAM polar encoder 500 of FIG. 5 may be performed by the processor 230.

Referring to FIG. 5, a polar code applier 510, postcoders 520 and 530, and a 16-PAM mapper 540 may be respectively an extended form of the polar code applier 310, the postcoder 410, and the 4-PAM mapper 320. Accordingly, the processor 230 may extend operation of the 4-PAM polar encoder 400 and apply the same to the 16-PAM polar encoder 500.

According to an embodiment of the disclosure, the processor 230 may determine a value of a shaping bit such that a probability distribution of a 16-PAM transmission signal is equal to Equation 8.

$$\begin{cases} Pr(c_{1i} = 1) = 1 - Pr(c_{1i} = 0) = p_1, & 0 \leq i < N/4 \\ Pr(c_{2i} = 1) = 1 - Pr(c_{2i} = 0) = p_2, & N/4 \leq i < N/2 \\ Pr(c_{3i} = 1) = 1 - Pr(c_{3i} = 0) = p_3, & N/2 \leq i < 3N/4 \\ Pr(c_{4i} = 1) = 1 - Pr(c_{4i} = 0) = p_4, & 3N/4 \leq i < N \end{cases} \quad \text{Equation 8}$$

According to an embodiment of the disclosure, in 16-PAM, a total of 16 types of symbols corresponding to codeword bits may be available. Accordingly, a 16-PAM probability distribution (not shown) may be calculated with respect to sixteen symbols corresponding to codeword bits. The postcoders 520 and 530 may adjust probabilities of $P_1$ through $P_4$ by using shaping bits and shape a bit probability of each input signal such that a probability distribution of codeword bits is close to a Gaussian distribution.

That is, the 16-PAM polar encoder 500 may respectively adjust probabilities of symbols corresponding to codeword bits to p1p2p3p4 through (1−p1)(1−p2)(1−p3)(1−p4) according to Equation 8 presented above, and accordingly, the 16-PAM polar encoder 500 may obtain a probability distribution that is closer to a Gaussian form than a probability distribution of 4-PAM codeword bits. Accordingly, the 16-PAM polar encoder 500 may obtain a shaping gain greater than the 4-PAM polar encoder 400.

According to an embodiment of the disclosure, the longer a length of a transmission signal $$\left(\frac{N}{2^r}\right),$$

the better the performance by signal shaping may be improved.

Figure 6A:
FIG. 6A is a diagram of a generator matrix to which one shaping bit is allocated, according to an embodiment of the disclosure.
Figure 6B:
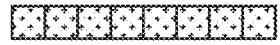
FIG. 6B is a diagram of a generator matrix to which two shaping bits are allocated, according to an embodiment of the disclosure.
Figure 6B:

FIGS. 6A through 6C illustrate a Hamming weight condition of a partial vector according to an embodiment of the disclosure.

FIG. 6A is a diagram of a generator matrix $G_{16}$ when one shaping bit is allocated, according to an embodiment of the disclosure. Referring to FIG. 6A, an input signal may be an input vector u consisting of 16 bits. The input vector u may include information bits and frozen bits. However, for convenience of description, u will be assumed to be a vector consisting of information bits.

According to an embodiment of the disclosure, a codeword c may be obtained according to Equation 3 described above. That is, the codeword c may be obtained by a codeword $c=uG_N$. In detail, according to an embodiment of the disclosure, when the input vector u is [1000 0001 0000 0000], the codeword c may be obtained as [0010 1010 1010 1010] which is a sum of first and eighth rows of the generator matrix $G_{16}$.

When the processor 230 allocates 1 ($2^r=1$) shaping bit, the processor 230 may divide a codeword consisting of 16 bits into one partial vector having a length of 16

$$\left(\frac{N}{2^r}=16\right).$$

That is, when one shaping bit is allocated, a codeword may not be divided into partial vectors.

In addition, when a target probability of the codeword c is equal to or less than 0.5, a Hamming weight condition may be set such that a Hamming weight of the codeword c is equal to or less than 8 which is a half of the length of 16 ($W_H(c)\le 8$). When the target probability of the codeword c is less than 0.5, a Hamming weight condition may obviously be set such that a Hamming weight of the codeword c is less than 8 which is a half of the length of 16 ($W_H(c)\le 8$).

In the above-described embodiment of the disclosure, when the input vector u is [1000 0001 0000 0000], the codeword c is [0010 1010 1010 1010], and a Hamming weight of the codeword c is 7 and thus satisfies the Hamming weight condition (a target probability of the codeword c being equal to or less than 0.5), and thus there is no need to allocate a shaping bit.

When the target probability of the codeword c exceeds 0.5, the hamming weight condition is $W_H(c)>8$, and accordingly, a Hamming weight of the input vector u is 7 and thus does not satisfy the Hamming weight condition. Referring to FIG. 6A, the processor 230 may allocate a shaping bit to a last bit of the input vector u. In detail, when a value of a shaping bit is 1, the input vector u is [1000 0001 0000 0001], and thus the codeword c may be [1101 0101 0101 0101]. When a shaping bit of a value of 1 is allocated, a Hamming weight of the codeword c is 9 and thus may satisfy the Hamming weight condition (a target probability of the codeword c exceeding 0.5). That is, a position and the number of shaping bits may be adjusted based on a preset target probability of codeword bits.

FIG. 6B is a diagram of a generator matrix to which two shaping bits are allocated, according to another embodiment of the disclosure.

Referring to FIG. 6B, when the processor 230 allocates two ($2^r=2$) shaping bits, the processor 230 may divide a codeword consisting of 16 bits into two partial vectors c1 and c2 each having a length of 8

$$\left(\frac{N}{2^r}=8\right).$$

By referring to FIG. 6B, it will be assumed that a shaping bit is allocated to the last two bits of the input vector u. Information bits may be allocated to 14 bits of the input vector u, and shaping bits may be allocated to two bits thereof.

When a target probability of the codeword c is equal to or less than 0.5, a Hamming weight condition may be set such that a Hamming weight of each of the partial vectors c1 and c2 is equal to or less than 4 which is a half of the length of 8 ($W_H(c1)\le 4$, $W_H(c2)\le 4$).

The Hamming weight of the partial vectors c1 and c2 may be adjusted by using a position and a value of a shaping bit allocated to the input vector. In addition, an operation of adjusting a Hamming weight of a partial vector by adjusting a value of a shaping bit is the same as that described with reference to FIG. 6A, and thus description thereof will be omitted here.

FIG. 6C is a diagram of a generator matrix to which four shaping bits are allocated, according to another embodiment of the disclosure.

Referring to FIG. 6C, when the processor 230 allocates four ($2^r=4$) shaping bits, the processor 230 may divide a codeword consisting of 16 bits into four partial vectors c1, c2, c3, and c4 each having a length of 4

$$\left(\frac{N}{2^r}=4\right).$$

As described above with reference to FIGS. 6A and 6B, according to a target probability of codeword bits, the processor 230 may adjust a Hamming weight of the four partial vectors c1, c2, c3, and c4.

Figure 7:
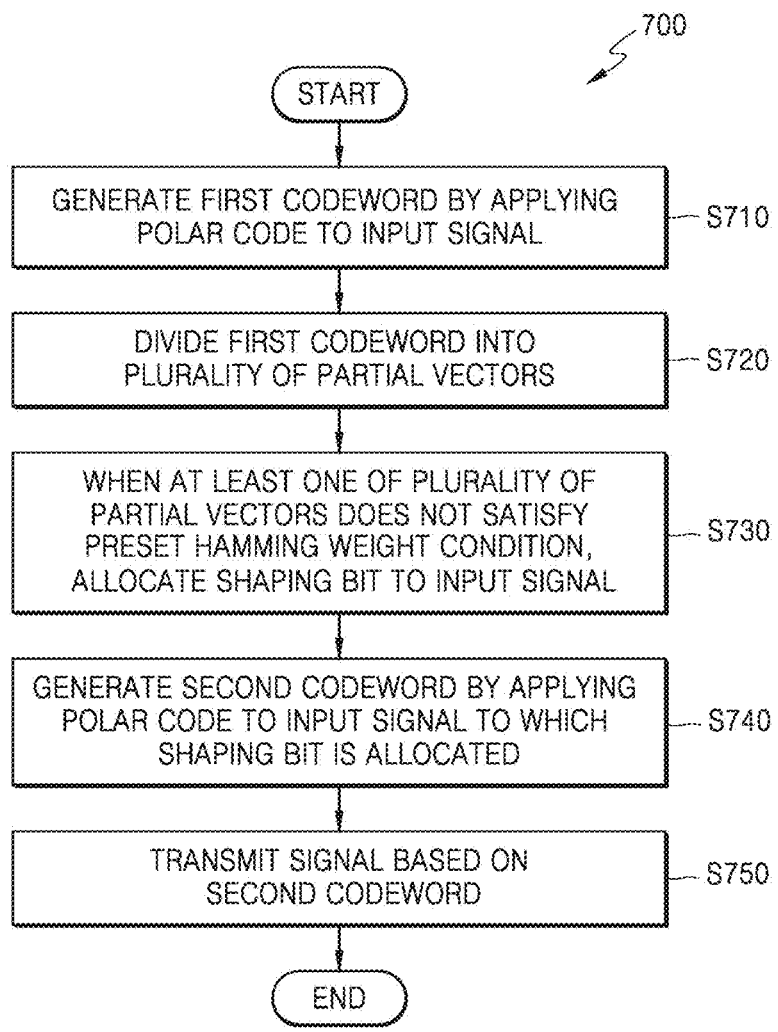
FIG. 7 is a flowchart of a method of encoding a signal by using a polar code, according to an embodiment of the disclosure.

FIG. 7 is a flowchart of a method of transmitting a signal by using a polar code, according to an embodiment of the disclosure. In addition, FIG. 7 illustrates a flow of operations performed in a transmitter device according to the embodiments described with reference to FIGS. 1 through 6C.

Referring to FIG. 7, a method 700 of encoding a signal by using a polar code, according to an embodiment of the disclosure, may be performed using the transmitter device 110 or 200 according to the embodiment of the disclosure described with reference to FIGS. 1 through 6C, and the operations performed in the transmitter device 110 or 200 may equally correspond to operations included in the method 700 of encoding a signal by using a polar code. Accordingly, in the description of the method 700 of encoding a signal by using a polar code, description provided already above in the description of the embodiments with reference to FIGS. 1 through 6C will be omitted.

According to the method 700 of encoding a signal by using a polar code, the transmitter device 200 including the communicator 210, the memory 220 storing at least one instruction, and the processor 230 including at least one processor executing the at least one instruction is controlled.

Referring to FIG. 7, the processor 230 may generate a first codeword by applying a polar code to an input signal at operation S710.

Also, the processor 230 may divide the first codeword into a plurality of partial vectors at operation S720. Here, the plurality of partial vectors may be vectors obtained by dividing a codeword consisting of a linear combination of a generator matrix $G_N$.

In addition, when at least one of the plurality of partial vectors does not satisfy a preset Hamming weight condition, the processor 230 may allocate a shaping bit to the input signal at operation S730. For example, the processor 230 may allocate a shaping bit to the input signal by inverting, to 0 or 1, a value of each bit constituting a partial vector having a Hamming weight exceeding $$\frac{N}{2^{r+1}}$$

which is a half of $$\frac{N}{2^r},$$

from among the plurality of partial vectors.

The processor 230 may generate a second codeword by applying a polar code to the input signal to which the shaping bit is allocated at operation S740. In addition, the processor 230 may transmit a signal based on the second codeword at operation S750.

Hereinafter, an operation of a receiver device according to an embodiment of the disclosure will be described with reference to FIGS. 8 through 10.

Figure 8:
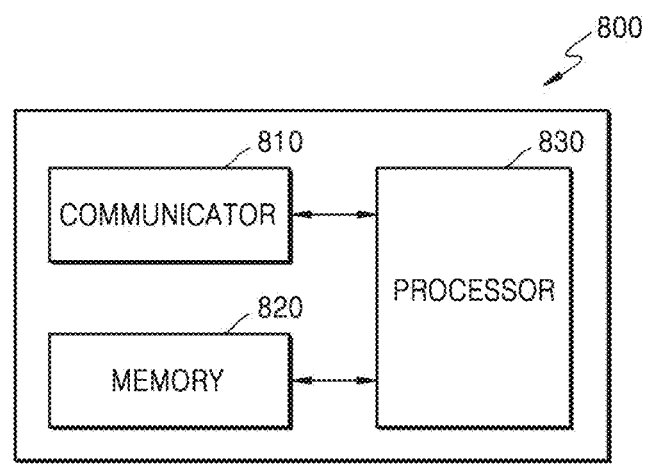
FIG. 8 is a structural block diagram of a receiver device according to an embodiment of the disclosure.

FIG. 8 is a structural block diagram of a receiver device according to an embodiment of the disclosure. A receiver device 800 according to an embodiment of the disclosure may correspond to the receiver device 120 described with reference to FIG. 1.

Referring to FIG. 8, thus, in the description of the receiver device 800, description of those details provided with reference to the embodiment of FIG. 1 will be omitted. In addition, as described above, for convenience, the transmitter device 110 and the receiver device 120 are described as being separately included. That is, when operations of a communicator 810, a memory 820, and a processor 830 respectively correspond to those of the communicator 210, the memory 220, and the processor 230, description thereof will be omitted.

Referring to FIG. 8, the receiver device 800 according to an embodiment of the disclosure may include the communicator 810 performing communication with at least one other device, the memory 820 storing at least one instruction, and the processor 830 executing the at least one instruction.

In a method of receiving a signal by using a polar code, the processor 830 may receive a signal including a codeword to which a shaping bit is allocated to satisfy a Hamming weight condition, determine a preset number of decoding paths by performing successive cancellation decoding or successive cancellation list decoding on the received signal, and determine whether the received signal has an error based on whether a Hamming weight of partial vectors included in codewords respectively corresponding to the decoding paths satisfies a Hamming weight condition, and select a final decoding path based on a result of the determining of whether the signal has an error.

The communicator 810 may perform communication with at least one other device. In detail, the communicator 810 may receive data from the at least one other device. That is, the communicator 810 may receive data from the transmitter device 200.

The processor 830 may receive, via the communicator 810, a signal having a probability distribution shaped by a shaping bit. In detail, the processor 830 may receive a signal including a codeword in which a shaping bit is allocated to a partial vector having a Hamming weight exceeding a reference value.

In addition, the processor 830 may perform successive cancellation decoding to determine a decoding path of the received signal. Successive cancellation decoding refers to a decoding method in which at least one transmission signal being a frozen bit is completely trusted to be a value of 0 (reliability of 1) and a probability that at least one transmission signal being an information bit is completely trusted to be 0 or 1 (reliability of 1), and the other decoding paths are determined based on these reliabilities.

A list decoding process will be described below with reference to FIGS. 9A and 9B.

Figure 9A:
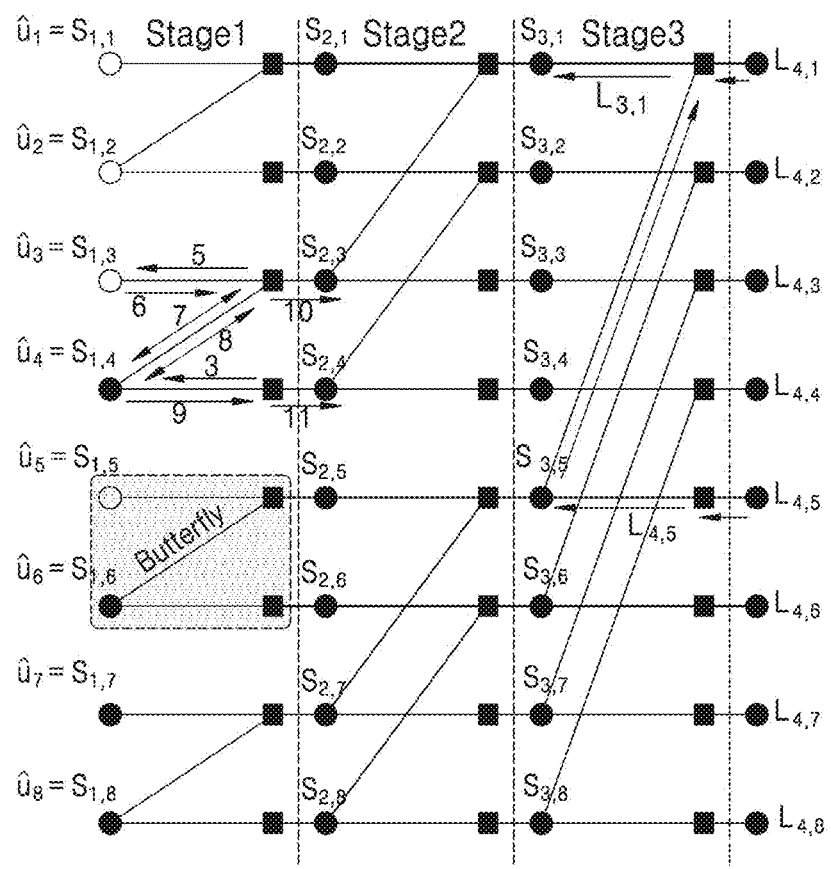
FIG. 9A illustrates successive cancellation decoding according to an embodiment of the disclosure.
Figure 9B:
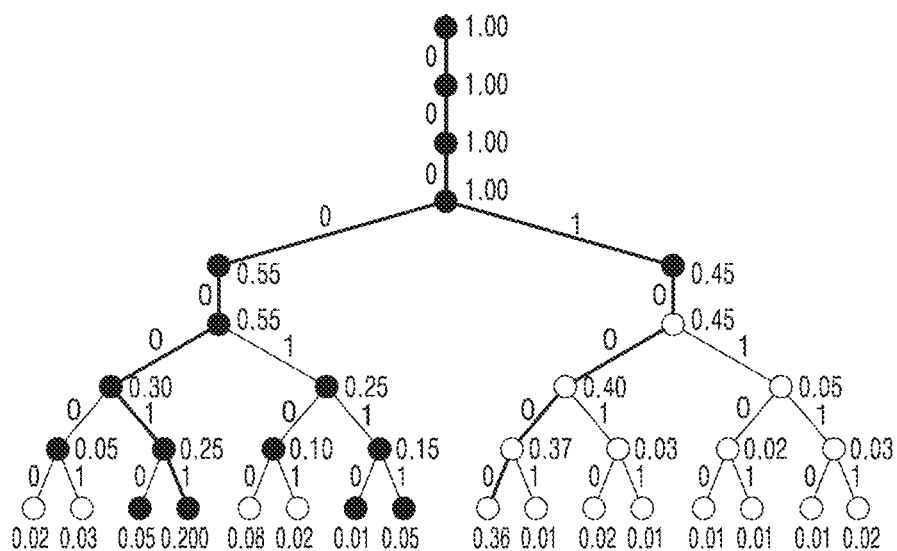
FIG. 9B illustrates successive cancellation list decoding according to an embodiment of the disclosure.

FIG. 9A is a diagram showing successive cancellation decoding according to an embodiment of the disclosure, and FIG. 9B is a diagram showing successive cancellation list decoding according to an embodiment of the disclosure.

Referring to FIG. 9A, when transmitting (transmitting signals) $S_{1,1}$ through $S_{1,8}$ from a transmitter device to the receiver device 800, signals $L_{4,1}$ through $L_{4,8}$ may be received by the receiver device 800 according to a polar code. The processor 830 may estimate a value of $\hat{u}2$ while completely trusting a probability that $\hat{u}2$ is a value of 0 when $\hat{u}1$ estimated to be the transmission signal $S_{1,1}$ is a frozen bit. When $\hat{u}1$ estimated to be the transmission signal $S_{1,1}$ is an information bit, while completely trusting a probability that $\hat{u}1$ is 0 or 1, a probability that a value of $\hat{u}2$ is 0 which is a frozen bit or 0 or 1 which is an information bit may be estimated. According to the above-described method, the processor 830 may estimate $\hat{u}2$ through $\hat{u}8$ ($S_{1,1}$ through $S_{1,8}$). That is, the processor 830 may use a successive cancellation decoding method to estimate a signal actually input to a transmitter device.

As described above with reference to FIG. 9A, the processor 830 may determine a decoding path of high reliability while performing pruning for successive cancellation decoding. Here, the processor 830 may perform successive cancellation list decoding whereby the number of decoding paths to be selected is preset.

Referring to 9B, as $S_{3,1}$ may be estimated from $L_{4,1}$ through $L_{4,5}$ as described above, with reliability of 1, that is, by using one decoding path, $L_{4,1}$, $L_{4,5}$, and $S_{3,1}$ may be estimated. Here, a decoding path may be divided into two based on a reliability that $S_{2,1}$ is 0 or 1, and a probability that $S_{2,1}$ is 0 may be estimated to be 0.55, and a probability that $S_{2,1}$ is 1 may be estimated to be 0.45. The processor 830 may apply the above-described operations to all of $L_{4,1}$ through $L_{4,8}$.

Referring to FIG. 9B, when the processor 830 sets a number of decoding paths to two, two decoding paths may be finally determined. In a branch of a probability of 0.55, when a probability that a next bit is estimated to be 0 is 0.30, and a probability that a next bit is 1 is estimated to be 0.25, and in a branch of a probability of 0.45, when a probability that a next bit is 0 is estimated to be 0.4, and a probability that a next bit is 1 is estimated to be 0.05, the processor 830 may select only two decoding paths corresponding to those having a probability of 0.3 or 0.4, which is of a high probability. In the same manner, referring to FIG. 9B, a signal having a probability of 0.2 and a signal having a probability of 0.36 may be determined as final decoding paths.

Meanwhile, according to an embodiment of the disclosure, the processor 830 may perform a cyclic redundancy check (CRC) after performing successive cancellation decoding. That is, the processor 830 may perform a CRC on path remaining during CRC concatenation. When a decoding path does not satisfy the CRC, the processor 830 may exclude the decoding path.

According to an embodiment of the disclosure, the processor 830 may determine whether a Hamming weight of partial vectors included in codewords respectively corresponding to the determined decoding paths satisfies a Hamming weight condition.

That is, the processor 830 may encode a decoding path and determine whether a Hamming weight of a partial vector included in a vector matrix obtained by dividing a codeword corresponding to the decoding path satisfies a Hamming weight condition. Here, a reference value of the Hamming weight condition may be $$\frac{N}{2^{r+1}}.$$

The reference value is the same as that in the transmitter device, and thus description thereof will be omitted here.

When a Hamming weight of a partial vector does not satisfy the Hamming weight condition, the processor 830 may determine that an error has occurred in a received signal and exclude a corresponding decoding path from a final decoding path. In addition, the processor 830 may determine a codeword of a transmission signal based on a probability of each decoding path.

According to an embodiment of the disclosure, the processor 830 may also perform a CRC on codewords respectively corresponding to decoding paths and determine whether a Hamming weight of a codeword of a decoding path, which satisfies a result of performing CRC, from among determined decoding paths, satisfies the Hamming weight condition.

Accordingly, according to an embodiment of the disclosure, by allocating a shaping bit, the allocated shaping bit may be used in detecting a transmission error, thereby improving performance of a communication system. Furthermore, when detecting an error by using an estimated shaping bit, a data use rate may be increased.

FIG. 10 is a flowchart of a method of decoding a signal by using a polar code, according to an embodiment of the disclosure.

In addition, FIG. 10 illustrates a flow of operations performed in a receiver device according to the embodiments described with reference to FIGS. 8, 9A, and 9B.

Referring to FIG. 10, a method 1000 of receiving a signal by using a polar code, according to an embodiment of the disclosure, may be performed using the receiver device 120 or 800 according to the embodiments of the disclosure described with reference to FIGS. 1, 8, and 9A and 9B, and the operations performed in the receiver device 120 or 800 may equally correspond to operations included in the method 1000 of receiving a signal by using a polar code. Accordingly, in the description of the method 1000 of decoding a signal by using a polar code, description provided already above in the description of the embodiments with reference to FIGS. 1 through 9B will be omitted.

According to the method 1000 of decoding a signal by using a polar code, the receiver device 800 including the communicator 810, the memory 820 storing at least one instruction, and the processor 830 executing the at least one instruction is controlled.

The processor 830 may receive a signal including a codeword to which a shaping bit is allocated to satisfy a Hamming weight condition at operation S1010. In detail, the processor 830 may receive a signal having a codeword bit having a probability distribution shaped by a shaping bit, from a transmitter device, via the communicator 810.

In addition, the processor 830 may determine a preset number of decoding paths by performing successive cancellation decoding or successive cancellation list decoding on the received signal at operation S1020. The processor 830 may determine whether the received signal has an error, based on whether a Hamming weight of a partial vector included in codewords respectively corresponding to the determined decoding paths, satisfies the Hamming weight condition at operation S1030.

In addition, the processor 830 may determine a final decoding path based on a result of the determining of whether the signal has an error at operation S1040.

The method of transceiving a signal by using a polar code, according to an embodiment of the disclosure, may be implemented in the form of a program command executable by various computer means and recorded to a computer-readable medium. In addition, an embodiment of the disclosure may be in the form of a computer-readable recording medium having one or more programs recorded thereon including instructions for executing the above-described method of transceiving a signal by using a polar code.

The computer-readable recording medium may include program instructions, a data file, a data structure etc. alone or in combination. The program instructions written to the computer-readable recording medium may be specifically designed and configured for the embodiments of the disclosure or may be well-known and available to one of ordinary skill in the art of computer software. Examples of the computer-readable recording medium include magnetic media (e.g., hard disks, floppy disks, magnetic tapes, etc.), optical media (e.g., compact disc-read only memories (CD-ROMs), or digital versatile discs (DVDs)), magneto-optical media (e.g., floptical disks), and hardware devices specifically configured to store and execute program instructions (e.g., ROM, random access memory (RAM), flash memories, etc.). Examples of the program instructions include not only machine codes generated by using a compiler but also high-level language codes that can be executed on a computer by using an interpreter or the like.

In addition, the method of transceiving a signal by using a polar code according to an embodiment of the disclosure described above may be implemented by a computer program product including a recording medium having stored thereon a program for performing an operation of obtaining a multilingual sentence; and an operation of obtaining vector values corresponding to each of the words included in the multilingual sentence by using a multilingual translation model, converting the obtained vector values into vector values corresponding to a target language, and obtaining a sentence composed of the target language based on the vector values.

According to the method of transceiving a signal by using a polar code, according to the embodiment of the disclosure, and a device for performing the method, a probability distribution of bits constituting a codeword may be adjusted to reduce a rate of communication error and improve communication performance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of transmitting a signal by using a polar code, the method comprising:
   generating a first codeword by applying the polar code to an input signal;
   dividing the first codeword into a plurality of partial vectors;
   allocating at least one shaping bit to the input signal when at least one of the plurality of partial vectors does not satisfy a preset Hamming weight condition;
   generating a second codeword by applying the polar code to the shaping bit-allocated input signal; and
   transmitting the signal based on the second codeword.

2. The method of claim 1,
   wherein the dividing of the first codeword comprises, when the allocated at least one shaping bit includes $2^r$ shaping bits, dividing the first codeword consisting of N bits into $2^r$ partial vectors having a length of $$\frac{N}{2^r},$$

and
   wherein the Hamming weight condition is set such that, according to a target probability of the first codeword, a Hamming weight of each of the plurality of partial vectors exceeds or is less than $$\frac{N}{2^{r+1}}$$

which corresponds to a half of the length $$\frac{N}{2^r}.$$

3. The method of claim 2, wherein the Hamming weight condition is set such that:
   when the target probability of the first codeword is less than ½, the Hamming weight of the plurality of partial vectors is set to be less than $$\frac{N}{2^{r+1}}$$

which corresponds to a half of the length $$\frac{N}{2^r},$$

and
   when the target probability of the first codeword exceeds ½, the Hamming weight of the plurality of partial vectors is set to exceed $$\frac{N}{2^{r+1}}$$

which corresponds to a half of the length $$\frac{N}{2^r}.$$

4. The method of claim 1, wherein the allocating of the at least one shaping bit comprises determining a position and a number of the at least one shaping bit according to a preset target probability of bits of the first codeword.

5. The method of claim 1, further comprising:
   performing cyclical redundancy check (CRC) encoding on the second codeword; and
   transmitting the CRC-encoded second codeword.

6. A method of receiving a signal by using a polar code, the method comprising:
   receiving a signal including a codeword to which a shaping bit is allocated to satisfy a Hamming weight condition;
   determining a preset number of decoding paths by performing on the received signal one of successive cancellation decoding or successive cancellation list decoding;
   determining whether the received signal has an error, based on whether a Hamming weight of a partial vector included in codewords respectively corresponding to the determined decoding paths satisfies the Hamming weight condition; and
   selecting a final decoding path from among the determined decoding paths based on a result of the determining of whether the received signal has an error.

7. The method of claim 6,
   wherein the determining of whether the received signal has an error further comprises dividing a codeword from among the codewords respectively corresponding to the determined decoding paths into $2^r$ partial vectors having a length of $$\frac{N}{2^r},$$

each of the codewords respectively corresponding to the determined decoding paths consisting of N bits, and
wherein the Hamming weight condition is set such that, according to a target probability of the codewords respectively corresponding to the determined decoding paths, a Hamming weight of each of a plurality of partial vectors exceeds or is less than $$\frac{N}{2^{r+1}}$$

which corresponds to a half of the length $2^r$.

8. The method of claim 7, wherein the determining of whether the received signal has an error further comprises determining that the Hamming weight of the partial vector included in the codewords from among the codewords respectively corresponding to the determined decoding paths does not satisfy the Hamming weight condition.

9. The method of claim 8, wherein the selecting of the final decoding path comprises selecting a decoding path other than the decoding path determined to have an error, as the final decoding path.

10. The method of claim 6, further comprising:
performing a CRC on the codewords respectively corresponding to the determined decoding paths,
wherein the determining of whether the received signal has an error comprises determining whether a codeword from among the codewords respectively corresponding to the determined decoding paths satisfies the Hamming weight condition, based on a result of the performing of the CRC.

11. A transmitter device for transmitting a signal by using a polar code, the transmitter device comprising:
a communicator configured to perform communication with at least one other device;
a memory storing at least one instruction; and
at least one processor operatively coupled to the communicator and the memory and configured to execute the at least one instruction,
wherein the at least one instruction configures the at least one processor to:
generate a first codeword by applying the polar code to an input signal,
divide the first codeword into a plurality of partial vectors,
allocate at least one shaping bit to the input signal when at least one of the plurality of partial vectors does not satisfy a Hamming weight condition,
generate a second codeword by applying the polar code to the input shaping bit-allocated signal, and
transmit the signal based on the second codeword.

12. The transmitter device of claim 11,
wherein the at least one instruction further configures the at least one processor to, when the allocated at least one shaping bit includes $2^r$ shaping bits, divide the first codeword consisting of N bits into $2^r$ partial vectors having a length of $$\frac{N}{2^r},$$

and
wherein the Hamming weight condition is set such that, according to a target probability of the first codeword, a Hamming weight of each of the plurality of partial vectors exceeds or is less than $$\frac{N}{2^{r+1}}$$

which corresponds to a half of the length $$\frac{N}{2^r}.$$

13. The transmitter device of claim 11, wherein the at least one instruction further configures the at least one processor to set the Hamming weight condition such that:
when a target probability of the first codeword is less than ½, a Hamming weight of each of the plurality of partial vectors is set to less than $$\frac{N}{2^{r+1}}$$

corresponding to a half of a length of $$\frac{N}{2^r},$$

and
when a target probability of the first codeword exceeds ½, the at least one processor is further configured to set a Hamming weight of each of the plurality of partial vectors to exceed $$\frac{N}{2^{r+1}}$$

corresponding to a half of the length of $$\frac{N}{2^r}.$$

14. The transmitter device of claim 11, wherein the at least one instruction further configures the at least one processor to determine a position and a number of the at least one shaping bit according to a preset target probability of bits of the first codeword.

15. The transmitter device of claim 11, wherein the at least one instruction further configures the at least one processor to:
perform cyclic redundancy check (CRC) encoding on the second codeword, and
transmit the CRC-encoded second codeword.

16. A receiver device for receiving a signal by using a polar code, the receiver device comprising:
a communicator configured to perform communication with at least one other device;
a memory storing at least one instruction; and
at least one processor operatively coupled to the communicator and the memory and configured to execute the at least one instruction, wherein the at least one instruction configures the at least one processor to:
receive a signal including a codeword to which a shaping bit is allocated to satisfy a Hamming weight condition,
determine a preset number of decoding paths by performing on the received signal one of successive cancellation decoding or successive cancellation list decoding,
determine whether the received signal has an error, based on whether a Hamming weight of a partial vector included in codewords respectively corresponding to the determined decoding paths satisfies a Hamming weight condition, and
select a final decoding path from among the determined decoding paths based on a result of the determination of whether the received signal has an error.

17. The receiver device of claim 16, wherein the at least one instruction further configures the at least one processor to:
when each of the codewords respectively corresponding to the determined decoding paths consists of N bits, divide a codeword from among the codewords respectively corresponding to the determined decoding paths into partial vectors $2^r$ partial vectors having a length of $$\frac{N}{2^r},$$

and
set the Hamming weight condition such that, according to a target probability of the codewords respectively corresponding to the determined decoding paths, a Hamming weight of each of the partial vectors exceeds or is less than $$\frac{N}{2^{r+1}}$$

which corresponds to a half of the length $$\frac{N}{2^r}.$$

18. The receiver device of claim 17, wherein, to determine whether the received signal has an error, the at least one instruction further configures the at least one processor to determine that the Hamming weight of the partial vector included in the codewords from among the codewords corresponding to the determined decoding paths does not satisfy the Hamming weight condition.

19. The receiver device of claim 18, wherein, to select the final decoding path, the at least one instruction further configures the at least one processor to select a decoding path other than the decoding path determined to have an error, as the final decoding path.

20. The receiver device of claim 16, wherein the at least one instruction further configures the at least one processor to:
perform a CRC on the codewords respectively corresponding to the determined decoding paths, and
determine whether a codeword from among the codewords respectively corresponding to the determined decoding paths satisfies the Hamming weight condition, based on a result of the performing of the CRC.

* * * * *